(12) United States Patent
Kim et al.

(10) Patent No.: US 9,746,737 B2
(45) Date of Patent: Aug. 29, 2017

(54) LIQUID CRYSTAL DISPLAY DEVICE AND METHOD OF MANUFACTURING THE SAME

(71) Applicant: Samsung Display Co., Ltd., Yongin, Gyeonggi-Do (KR)

(72) Inventors: Si-Heun Kim, Yongin (KR); Chang-Hun Lee, Yongin (KR); Jun-Woo Lee, Yongin (KR)

(73) Assignee: Samsung Display Co., Ltd., Giheung-Gu, Yongin-si, Gyeonggi-Do (KR)

( * ) Notice: Subject to any disclaimer, the term of this patent is extended or adjusted under 35 U.S.C. 154(b) by 294 days.

(21) Appl. No.: 14/603,650

(22) Filed: Jan. 23, 2015

(65) Prior Publication Data

US 2016/0011464 A1    Jan. 14, 2016

(30) Foreign Application Priority Data

Jul. 8, 2014 (KR) ........................ 10-2014-0085358

(51) Int. Cl.
| | | |
|---|---|---|
| *G02F 1/141* | (2006.01) | |
| *G02F 1/137* | (2006.01) | |
| *G02F 1/1337* | (2006.01) | |

(52) U.S. Cl.
CPC ........ *G02F 1/137* (2013.01); *G02F 1/133753* (2013.01); *G02F 1/133788* (2013.01); *G02F 2001/133761* (2013.01)

(58) Field of Classification Search
CPC ............... G02F 1/137; G02F 1/133753; G02F 1/133788

USPC ......................................................... 349/134
See application file for complete search history.

(56) References Cited

U.S. PATENT DOCUMENTS

| | | | |
|---|---|---|---|
| 6,894,743 B1* | 5/2005 | Takatori | G02F 1/133553 349/106 |
| 2002/0027630 A1* | 3/2002 | Yamada | G02F 1/133753 349/123 |
| 2005/0041197 A1 | 2/2005 | Ionescu | |
| 2005/0104843 A1* | 5/2005 | Schlangen | G02F 1/167 345/107 |
| 2005/0179003 A1 | 8/2005 | Heckmeier et al. | |
| 2008/0142758 A1 | 6/2008 | Golding et al. | |

(Continued)

OTHER PUBLICATIONS

Yuji Kawanishi et al, Nematic Homogeneous Alignment Regulated by the Polarization Photochromism of Surface Azobenzenes, Molecular Crystals and Liquid Crystals Science and Technology,1992, p. 153-158, vol. 218, Issue I, Gordon and Breach Science Publishers S.A., United States of America.

(Continued)

*Primary Examiner* — Lucy Chien
(74) *Attorney, Agent, or Firm* — Robert E. Bushnell, Esq.

(57) ABSTRACT

Provided is a liquid crystal display device including a first substrate on which a first alignment layer is formed, a second substrate on which a second alignment layer is formed, and a liquid crystal layer disposed between the first and second alignment layers and including liquid crystals of a helical structure in which a helical axis is parallel to the first and second substrates. At least one of the first and second alignment layers has a graduation distribution profile of a pretilt angle which ranges from about 0 degrees to about 90 degrees.

20 Claims, 10 Drawing Sheets

(56) References Cited

U.S. PATENT DOCUMENTS

2010/0051194 A1    3/2010  Chien et al.

OTHER PUBLICATIONS

Hasegawa and Taira. "Nematic Homogenous Photo Alignment by Polyimide Exposure to Linearly Polarized UV." Journal of Photopolymer Science and Technology. vol. 8, No. 2 (1995) 241-248.
Schadt et al. "Surface-Induced Parallel Alignment of Liquid Crystals by Linearly Polymerized Photopolymers." Jpn. J. Appl. Phys. vol. 31 (1992) pp. 2155-2164. Part 1, No. 7, Jul. 1992.
Shteyner et al. "Submicron-scale liquid crystal photo-alignment." Soft Matter, 2013, 9, 5160.
"Flexoelectrooptics" Analog FLC Workshop. Jul. 17, 1999.

* cited by examiner

LIQUID CRYSTAL DISPLAY DEVICE AND METHOD OF MANUFACTURING THE SAME

CLAIM OF PRIORITY

This application claims the benefit of Korean Patent Application No. 10-2014-0085358, filed on Jul. 8, 2014, in the Korean Intellectual Property Office, the disclosure of which is incorporated herein in its entirety by reference.

BACKGROUND OF THE INVENTION

Field of the Invention

One or more embodiments of the present invention generally relate to a liquid crystal display device and a method of manufacturing the same, and particularly, to a liquid crystal display device having wide viewing angles and a fast response time and a method of manufacturing the same.

Description of the Related Art

A liquid crystal display device is one of the most widely used types of flat panel displays and includes two substrates on which field generating electrodes such as a pixel electrode and a common electrode are formed and a liquid crystal layer disposed between the substrates. The liquid crystal display device displays an image by generating an electric field in the liquid crystal layer based on a voltage applied to the field generating electrodes, determining orientation of liquid crystals based on the generated electric field and controlling polarization of incident light.

Examples of liquid crystal display devices may be a vertically aligned liquid crystal display device that drives liquid crystals by using an electric field generated in a vertical direction of a substrate, an in-plane switching liquid mode crystal display device using a horizontal electric field that is arranged parallel to a substrate, or the like.

The vertically aligned liquid crystal display device has a good contrast ratio, and through various designs, a vertically aligned liquid crystal display device having wide viewing angles and an improved aperture ratio may be achieved.

The in-plane switching mode liquid crystal display device has wide viewing angles and fast response times, and furthermore, through various designs, an in-plane switching mode liquid crystal display device having an improved contrast ratio due to reduced light leakage in an off state may be achieved.

Recently, a uniformly lying helix (ULH) mode liquid crystal display having wide viewing angles and fast response times has drawn attention.

SUMMARY OF THE INVENTION

One or more embodiments of the present invention include a liquid crystal display device having wide viewing angles and a fast response time and a method of manufacturing the same.

Additional aspects will be set forth in part in the description which follows and, in part, will be apparent from the description, or may be learned by practice of the presented embodiments.

According to one or more embodiments of the present invention, a liquid crystal display device includes a first substrate on which a first alignment layer is formed, a second substrate on which a second alignment layer is formed, and a liquid crystal layer disposed between the first and second alignment layers and including liquid crystals of a helical structure in which a helical axis is parallel to the first and second substrates. At least one of the first and second alignment layers has a graduation distribution profile of a pretilt angle which ranges from about 0 degrees to about 90 degrees.

The gradual distribution may be repeated in a predetermined cycle.

The gradual distribution may have a stepwise shape or a sine wave shape.

When the predetermined cycle is T and a pitch of the helical structure is P, T may be a natural number that is a multiple of P/2.

One of the first and second alignment layers may have the gradual distribution profile of the pretilt angle, and the other of the first and second alignment layers may be a planar alignment layer.

One of the first and second alignment layers may have the gradual distribution profile of the pretilt angle, and the other of the first and second alignment layers may be a homeotropic alignment layer.

A range of the pitch P of the helical structure may be 100 nm≤P≤1 µm.

One of the first and second alignment layers which has the gradual distribution of the pretilt angle may be formed of a polymerized photoreactive material of which an alignment direction is changed according to an amount of ultraviolet (UV) irradiation.

A thin film transistor (TFT) array may be formed on the first substrate, and color filters may be formed on the second substrate.

According to one or more embodiments of the present invention, a method of manufacturing a liquid crystal display device includes preparing two substrates, forming a first alignment layer having a gradual distribution profile of a pretilt angle which ranges from about 0 degree to about 90 degrees on at least one of the substrates, forming a second alignment layer on the other of the substrates, and forming a liquid crystal layer between the first and second alignment layers. The liquid crystal layer comprises liquid crystals having a helical structure in which a helical axis is parallel to the substrates.

The first alignment layer may be formed such that the gradual distribution is repeated in a predetermined cycle.

The gradual distribution may have a stepwise shape or a sine wave shape.

The forming of the first alignment layer may include forming an alignment composition layer including a polymerized vertical photo-alignment material on the substrates, and irradiating the alignment composition layer with different amounts of ultraviolet (UV) light by emitting different amounts of the UV light according to a position in the alignment composition layer.

In the irradiating of the alignment composition layer, when the predetermined cycle is T, the UV light may be emitted by using a light exposure device in which openings having a width equal to T/2 are arranged in the predetermined cycle T in a first direction.

In the irradiating of the alignment composition layer, a relative position between the light exposure device and the alignment composition layer may be moved at a predetermined distance in the first direction, and the UV light is emitted.

In the irradiating of the alignment composition layer, the predetermined distance may be equal to a width of each of the openings divided by N, wherein N is a natural number greater than 2.

The irradiating of the alignment composition layer may further include emitting UV light by using the light exposure device, which scans the alignment composition layer in a second direction perpendicular to the first direction.

The second alignment layer may be a homeotropic alignment layer.

The second alignment layer may be a planar alignment layer.

The second alignment layer may have a gradual distribution profile of a pretilt angle which ranges from about 0 degrees to about 90 degrees.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
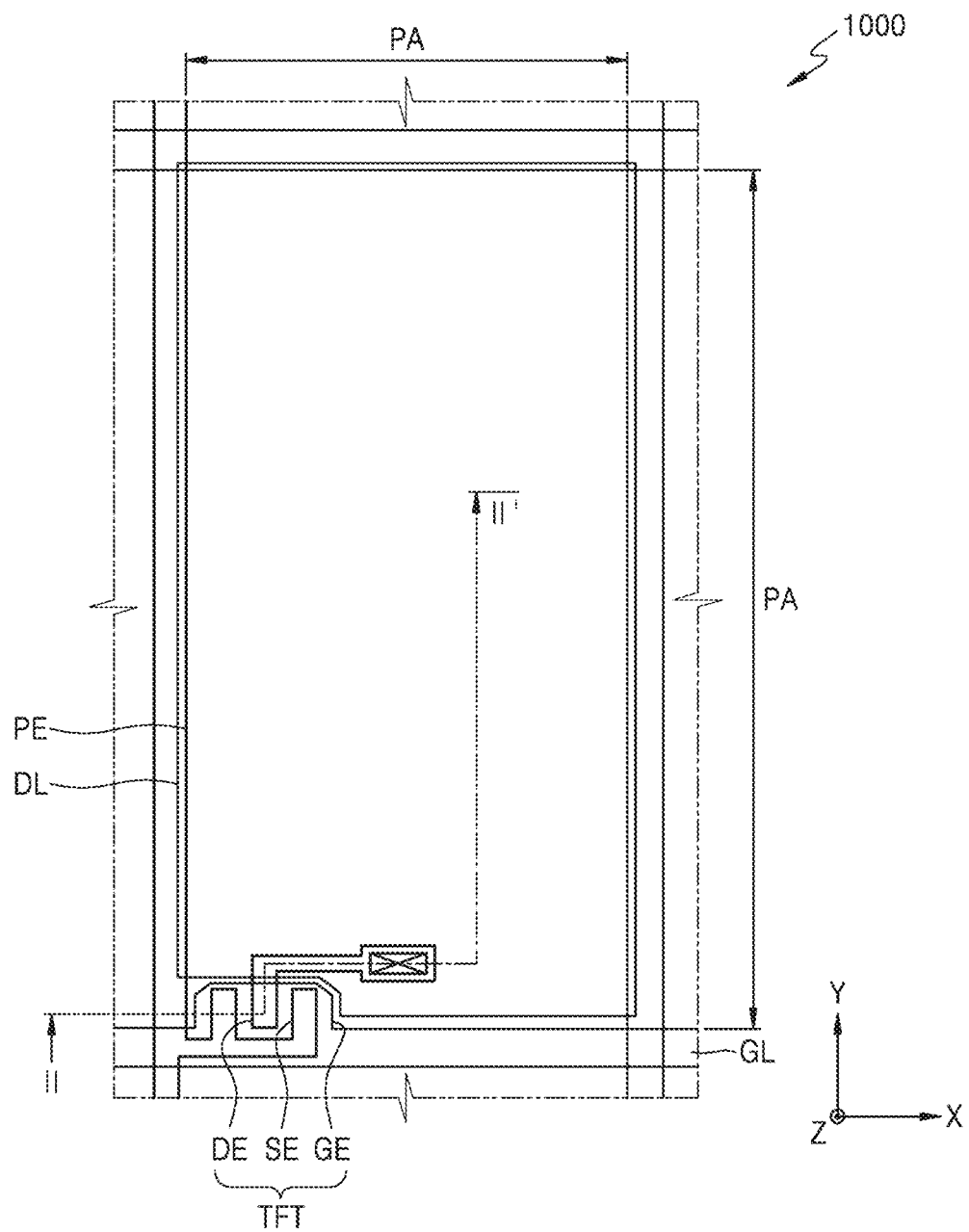
FIG. 1 is a schematic diagram of a liquid crystal display device according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art are omitted when it is deemed that they may unnecessarily obscure the essence of the invention.

Hereinafter, the present invention will be described in detail by explaining preferred embodiments of the invention with reference to the attached drawings. Like reference numerals in the drawings denote like elements, and repeated descriptions thereof will be omitted.

While such terms as "first", "second", etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that when a layer, region, or component is referred to as being "formed on" another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

Figure 2:
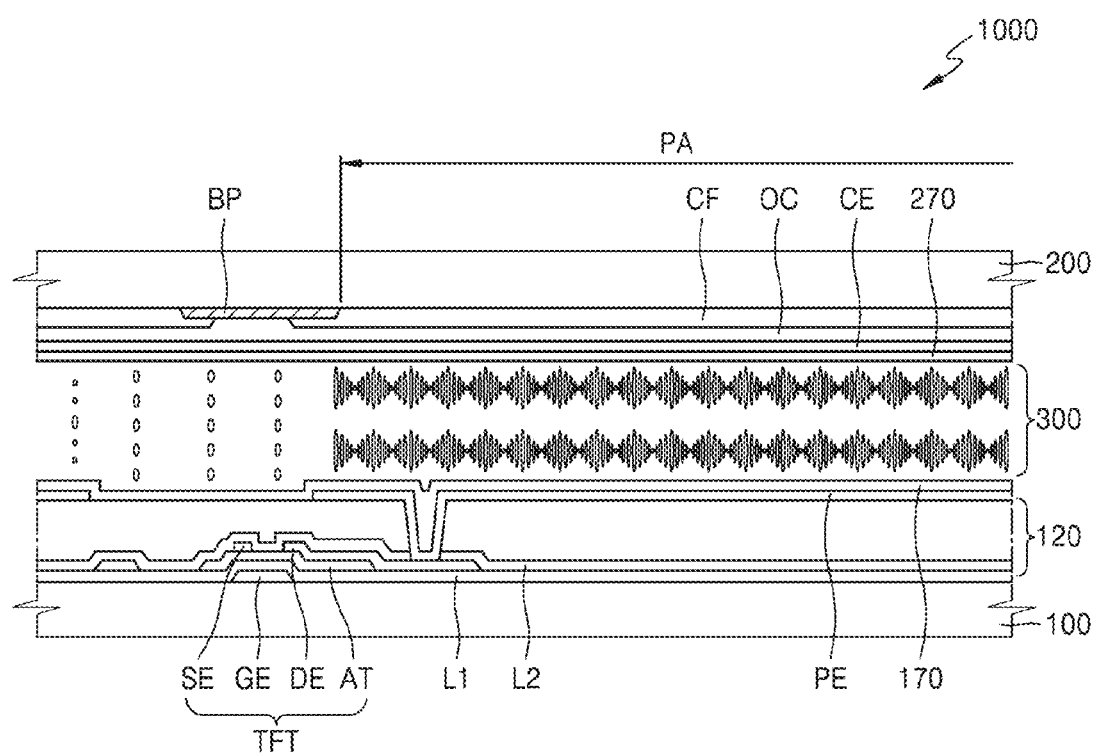
FIG. 2 is a cross-sectional view taken along a line II-IF of FIG. 1.

FIG. 1 is a schematic diagram of a liquid crystal display device 1000 according to an embodiment of the present invention. FIG. 2 is a cross-sectional view taken along a line II-II' of FIG. 1. FIGS. 3A through 3D show various relationships between a distribution cycle of a pretilt angle formed in an alignment layer of the liquid crystal display device 1000 and pitches of a helical structure of a liquid crystal layer, according to an embodiment of the present invention. FIGS. 4A and 4B show examples of distribution patterns of the pretilt angle that may be formed in an alignment layer of the liquid crystal display device 1000, according to embodiments of the present invention.

Referring to FIGS. 1 through 4B, the liquid crystal display device 1000 includes a first substrate 100 on which a first alignment layer 170 is formed, a second substrate 200 on which a second alignment layer 270 is formed, and a liquid crystal layer 300 disposed between the first and second alignment layers 170 and 270.

The liquid crystal layer 300 includes liquid crystals of a helical structure. In the helical structure, liquid crystal directors rotate around a helical axis HA that is parallel to the first and second substrates 100 and 200. The helical structure may be formed by adding chiral dopants to a bimesogenic material. A pitch P of the helical structure is a distance between the liquid crystal directors oriented in the same direction when the liquid crystal directors rotate around the helical axis HA and are arranged. A range of the pitch P of the helical structure may be 100 nm≤P≤1 μm.

A liquid crystal mode of the liquid crystal display device 1000 is a uniformly lying helix (ULH) mode, and the ULH mode turns on/off light through in-plane switching driving according to flexoelectrooptics and has a fast response time. The response time may be in a range from about 10 μs to about 100 μs. The in-plane switching driving will be described later.

In the case of the ULH mode, forming a stable initial alignment of the ULH mode is difficult. During a manufacturing procedure, it is likely that the ULH mode may be changed to a uniformly standing helix mode (USH) mode in which a helical axis is perpendicular to a substrate and thus is more stable than the ULH mode.

The liquid crystal display device 1000 includes the first and second alignment layers 170 and 270 for stable alignment of the ULH mode.

In the present embodiment, at least one of the first and second alignment layers 170 and 270 may have a gradual distribution profile of a pretilt angle which ranges from about 0 degrees to about 90 degrees. Based on the above structure, at least one of the first and second alignment layers 170 and 270 may have a gradual distribution profile of the pretilt angle, which is similar to distribution of a director's direction of the liquid crystals configuring the ULH mode.

Hereinafter, the pretilt angle is formed with respect to a surface of the first alignment layer 170 or the second alignment layer 270, that is, a surface parallel to the XY plane.

The gradual distribution may be repeated in a predetermined cycle, T. The cycle T has a predetermined relationship with the pitch P of the helical structure formed by the liquid crystals of the liquid crystal layer 300.

The pitch P of the helical structure and the cycle T may have the following relationship.

$$T=(½)*P*N, (N=1,2,3,\ldots)$$

That is, the cycle T may be a natural number that is a multiple of half of the pitch P of the helical structure.

Figure 3A:
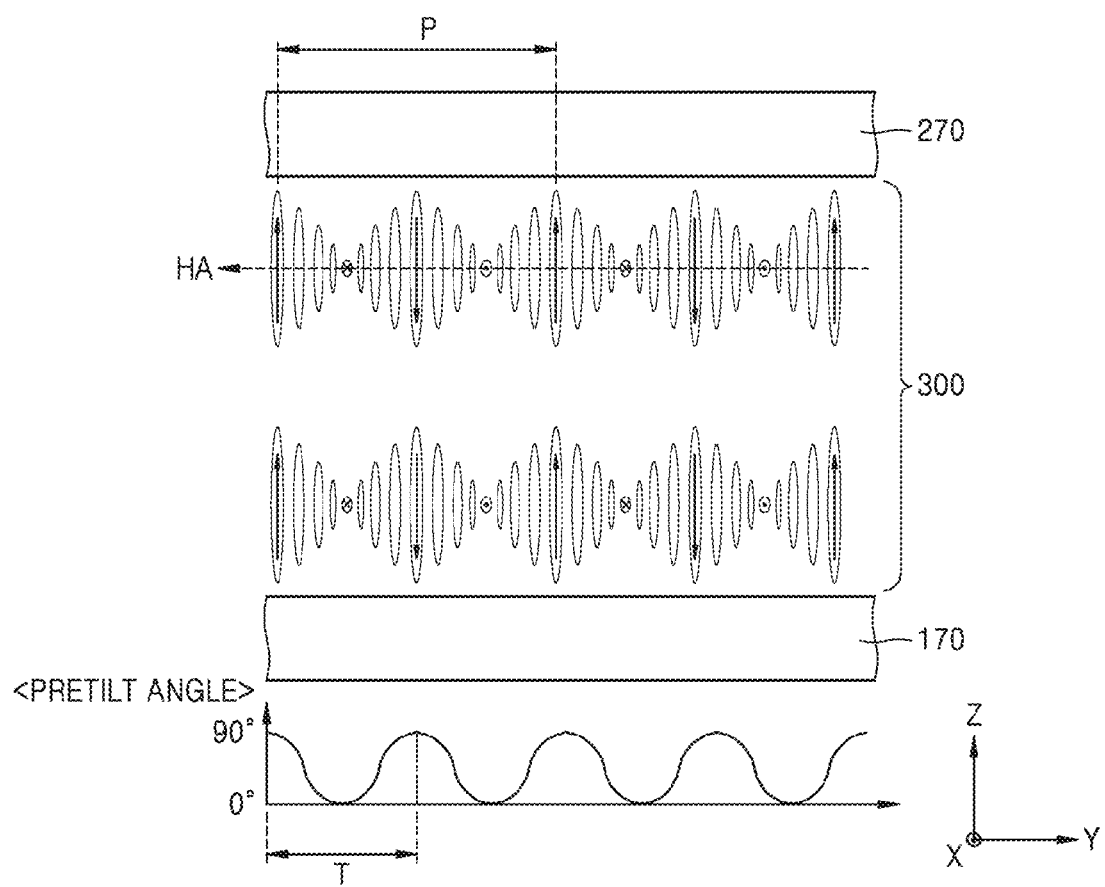
FIGS. 3A through 3D show various relationships between a distribution cycle of a pretilt angle formed in an alignment layer of the liquid crystal display device 1000 and pitches of a helical structure of a liquid crystal layer, according to an embodiment of the present invention.
Figure 3B:
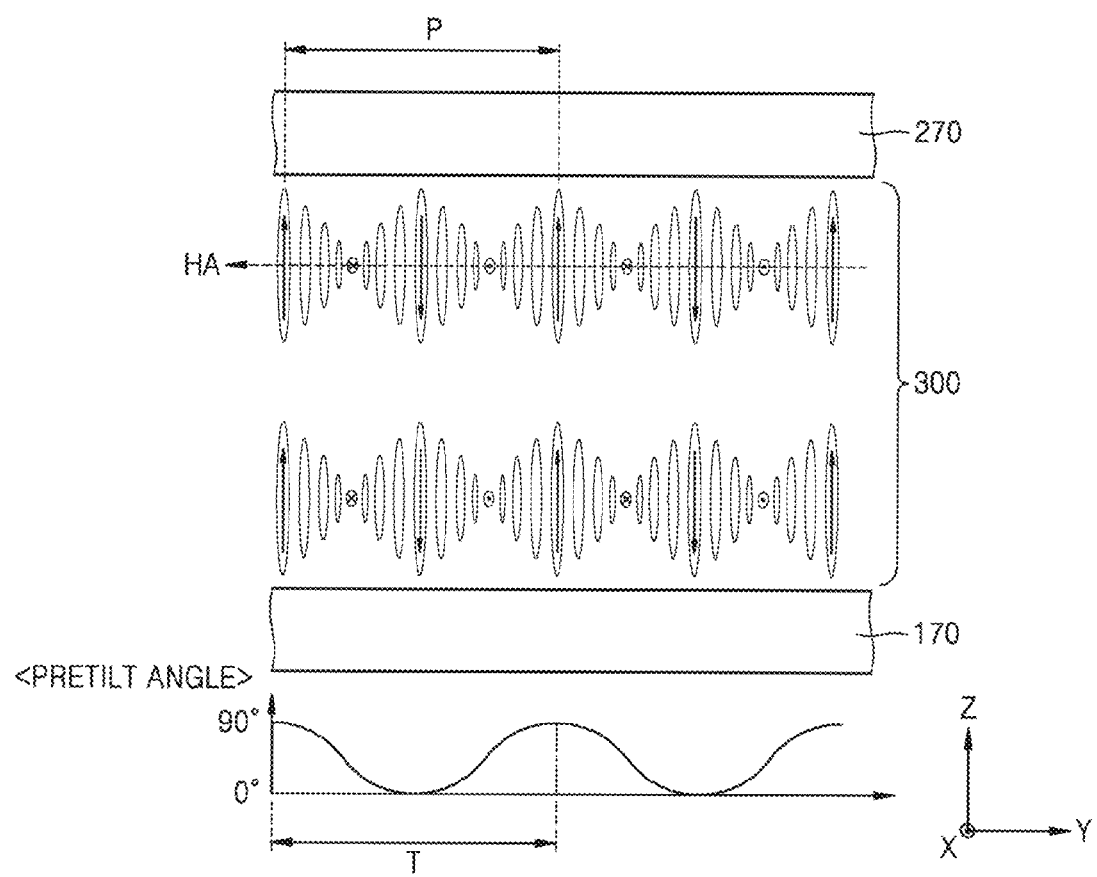
Figure 3C:
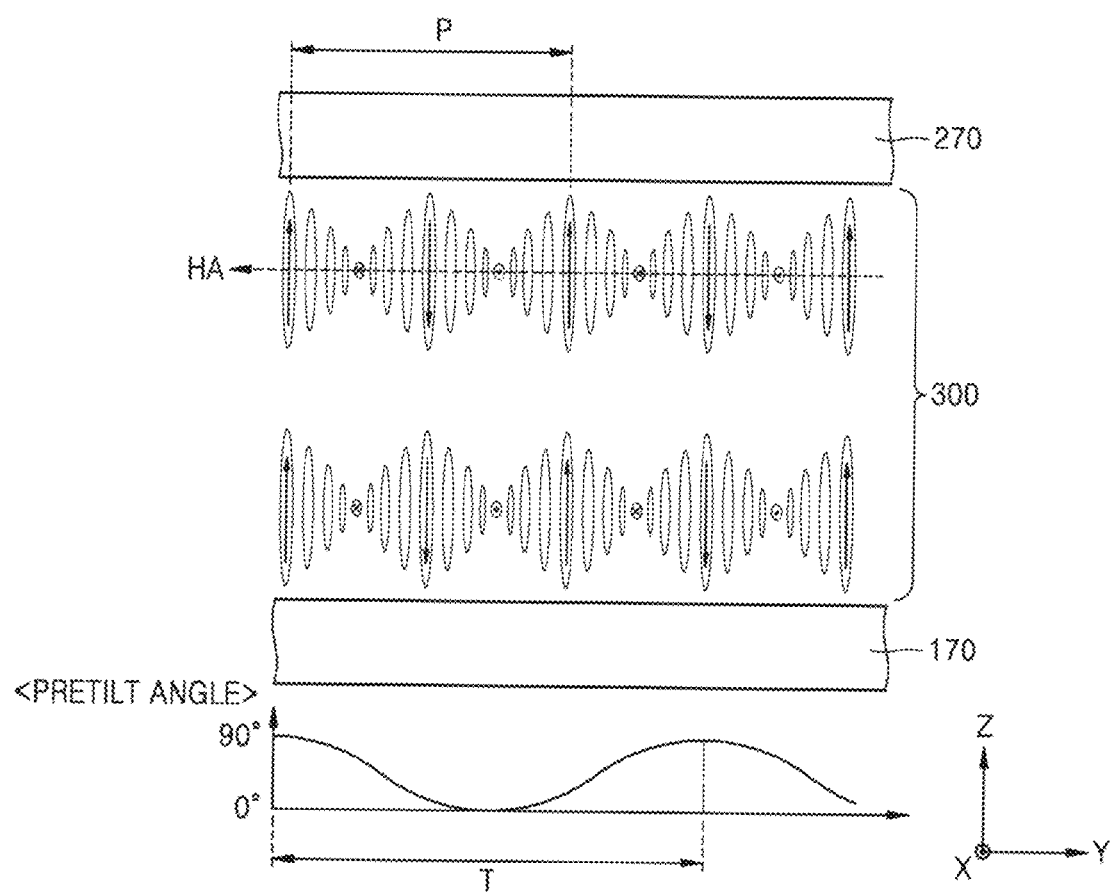
Figure 4A:
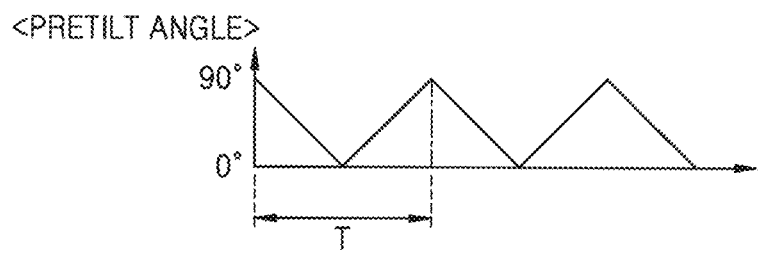
FIGS. 4A and 4B show examples of distribution patterns of the pretilt angle that may be formed in an alignment layer of the liquid crystal display device 1000, according to embodiments of the present invention.
Figure 4B:
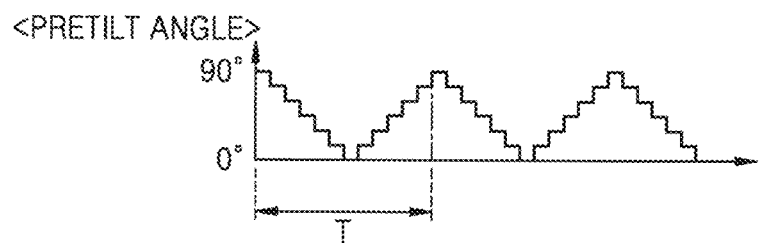

FIGS. 3A through 3C show respective cases where the natural number of 1, 2 and 3.

Figure 3D:
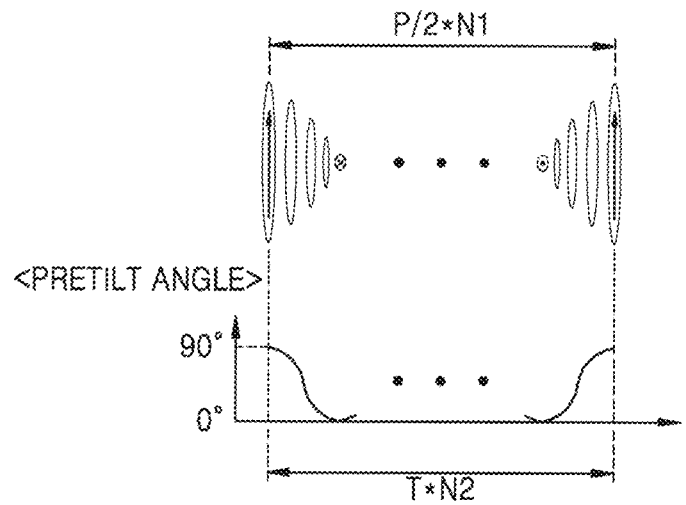

Referring to FIG. 3D, the pitch P of the helical structure and the cycle T may have the following relationship.

$$(½)*P*N1=T*N2, (N1, N2=1, 2, 3, \ldots)$$

$$T=(½)*P*(N1/N2)$$

The meaning of the above equation is as follows.

As shown in FIG. 3D, according to the distribution of the pretilt angle formed in an alignment layer, at least two vertical alignment groups are formed in an alignment layer. Due to the two vertical alignment groups, two liquid crystal directors facing the at least two vertical alignment groups are fixed. A distance between the vertical alignment groups may be indicated as T*N2. Also, a twist phenomenon of the liquid crystals, which may occur between the two liquid crystal directors that are fixed on locations corresponding to the two vertical alignment groups, may have a cycle that is a natural number that is a multiple of half of P, P/2. As a result, the above-described relationship may be made.

FIGS. 3A through 3D show an example of the gradual distribution having a sine wave shape, but the gradual distribution may be a different shape. For example, the gradual distribution may have a half-circular or parabolic shape.

FIG. 4A shows that the gradual distribution has a sawtooth shape, that is, a shape in which the pretilt angle is linearly increased and then decreased.

FIG. 4B show that the gradual distribution has a stepwise shape. That is, the pretilt angle is increased and the decreased in a stepwise manner.

The shape of the gradual distribution is not limited thereto and may vary.

The first alignment layer 170 and the second alignment layer 270 may have the distribution of the pretilt angle. Alternatively, one of the first alignment layer 170 and the second alignment layer 270 has a gradual distribution profile of a pretilt angle which ranges from about 0 degrees to about 90 degrees, and the other of the first alignment layer 170 and the second alignment layer 270 may be a planar alignment layer or a homeotropic alignment layer.

One of the first alignment layer 170 and the second alignment layer 270, which has the gradual distribution profile of the pretilt angle, may be formed of a polymerized photo-alignment material. For example, the alignment layer having a pretilt angle of the gradual distribution may be a light alignment layer formed of a polymerized photoreactive material, for example, polysilozane cinnamate (PSCN), Poly (w(4-chalconyloxy) alkoxyphenlymaleimide), or polyimide-based light alignment layer. However, the alignment layer is not limited thereto.

The gradual distribution profile of the pretilt angle may be formed by adjusting the irradiation amount of UV light to the above described materials, according to a position, and thus a distribution profile of a desired pretilt angle may be formed.

Hereinafter, a detailed structure of the liquid crystal display device 100 will be described in detail.

A thin film transistor (TFT) array layer 120, pixel electrodes PE, and the first alignment layer 170 are formed on the first substrate 100. The TFT array layer 120 includes gate lines GL, data lines DL, and switching devices TFT.

The first substrate 100 may be a glass substrate or a plastic substrate formed of, for example, polyethylen terephthalate (PET), polyethylen naphthalate (PEN), and polyimide.

The gate lines GL are extended in a first direction (an X direction) and arranged in a second direction (a Y direction) which intersects the first direction (the X direction). The data lines DL are extended in the second direction (the Y direction) and arranged in the first direction (the X direction). Each of the switching devices TFT is arranged on an area where the gate lines GL and the data lines DL intersect and is connected to the gate lines GL and the data lines DL.

The switching devices TFT are thin film transistors and include an active layer AT, gate electrodes GE, source electrodes SE, and drain electrodes DE.

A first insulating layer L1 that is a gate insluting layer is formed on the gate electrodes GE, and the active layer AT is formed on the first insulating layer L1. On the active layer AT, the gate electrodes GE and the source electrodes SE are spaced apart, and a second insulating layer L2 covering the gate electrodes GE and the source electrodes SE is formed.

The active layer AT may include various materials. For example, the active layer AT may include an inorganic semiconductor material such as amorphous silicon or crystalline silicon. As another example, the active layer AT may include an oxide semiconductor. As another example, the active layer AT may include an organic semiconductor material.

The gate electrodes GE, the source electrodes SE, and the drain electrodes DE may be a single layer or multiple layers formed of at least one selected from the group consisting of aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), and copper (Cu).

The first insulating layer L1 and the second insulating layer L2 may be formed of various insulating materials. The first insulating layer L1 and the second insulating layer L2 may be a single layer or multiple layers formed of at least one selected from the group SiO2, SiNx, SiON, Al2O3, TiO2, Ta2O5, HfO2, ZrO2, BST, and PZT.

Each of the pixel electrodes PE is arranged on a pixel area PA and formed on the TFT array layer 120 to be connected to the switching devices TFT. The first alignment layer 170 is formed on the pixel electrodes PE.

A blind pattern BP, a color filter CF, an over coating layer OC, a common electrode CE, and the second alignment layer 270 is formed on the second substrate 200.

The blind pattern BP is formed a location of the second substrate 200, which corresponds to a location where the gate lines GL, the data lines DL, and the switching devices TFT are formed, and blocks light.

The color filter CF is arranged on a location of the second substrate 200, which corresponds to the pixel area PA where the pixel electrodes PE are formed, and filters color light. However, arrangement of the color filter CF is not limited thereto and may be arranged on the first substrate 100.

The over coating layer OC is arranged on a location of the second substrate 200, where the color filter CF is formed and flattens an upper surface of the second substrate 200. The over coating layer OC may be excluded from the present embodiment.

The common electrode CE is arranged on the second substrate 200 so as to face the pixel electrodes PE, and a reference voltage, which defines a polarity of a voltage applied to the pixel electrodes PE, that is, a common voltage, is applied to the common electrode CE.

A polarization plate may be further formed on surfaces of the first substrate 100 and the second substrate 200. Polarization axes may intersect each other at a right angle, but are not limited thereto.

The liquid crystal layer 300 is formed of liquid crystals configuring the ULH mode. The ULH mode may include a bimesogenic material and chiral dopants, and a pitch P of a helical axis may be in a range of 100 nm≤P≤1 μm. Since, in the ULH mode a helical axis HA rotates in an in-plane manner, according to a vertical electric field formed by a voltage applied between the pixel electrodes PE and the common electrode CE, the ULH mode has a fast response time.

Figure 5A:
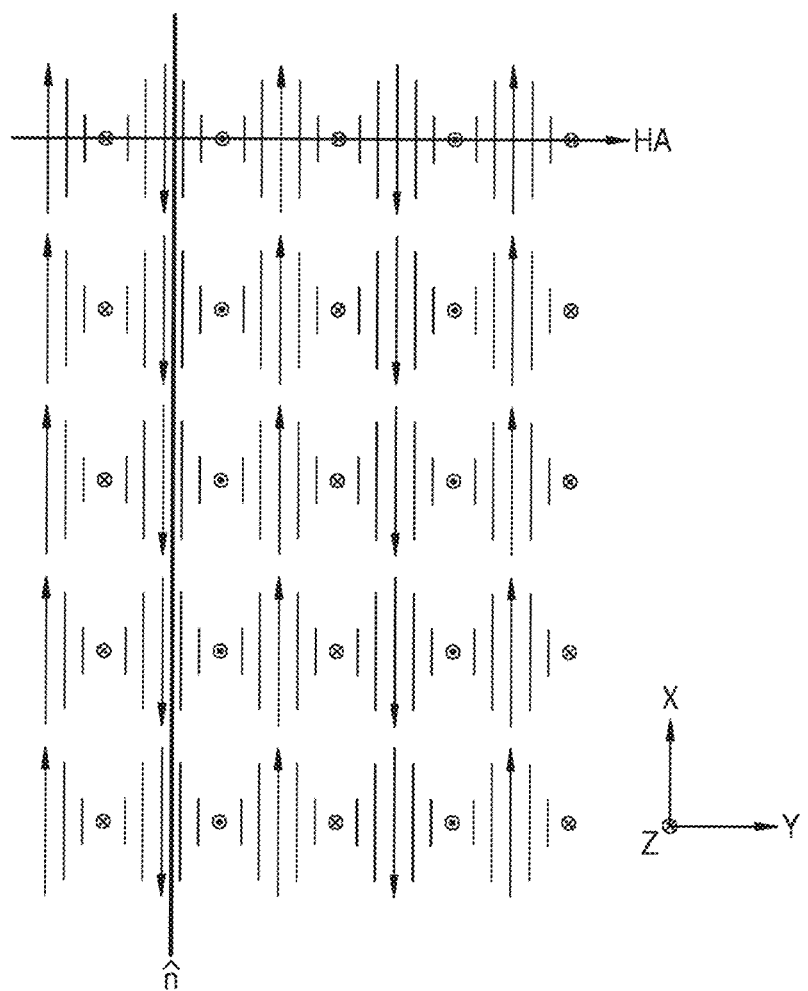
FIGS. 5A and 5B show directions of a helical axis of the liquid crystals when an electric field is not formed in a liquid crystal layer and when a vertical electric field is formed in the liquid crystal layer.
Figure 5B:
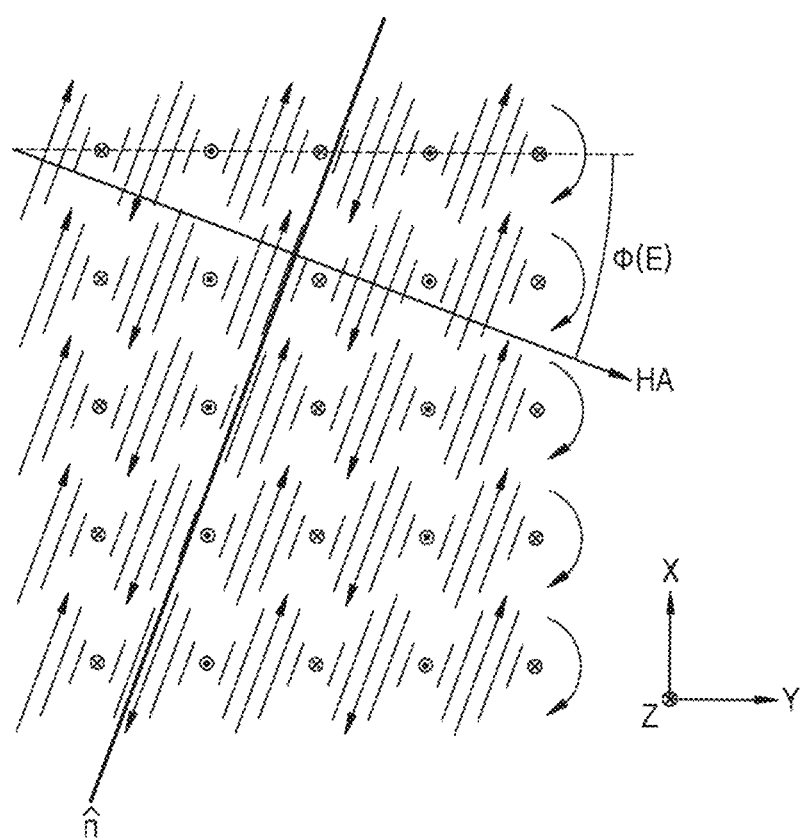

FIGS. 5A and 5B respectively show directions of a helical axis of the liquid crystals when an electric field is not formed in the liquid crystal layer 300 of the liquid crystal display device 1000 and when a vertical electric field is formed in the liquid crystal layer 300.

FIG. 5A shows that the electric field is not formed in the liquid crystal layer. n̂ denotes a director planar vector. When light penetrates a liquid crystal mode in a Z direction, the liquid crystal mode shows transmittance characteristic that is independent from polarization of incident light. That is, the transmittance does not differ according to the polarization of the incident light. Therefore, when polarization axes of polarization plates formed on surfaces of the first substrate 100 and the second substrate 200 cross at right angles, a black mode is formed.

FIG. 5B show a case in which an electric field E is formed in the liquid crystal layer in a Z direction. The liquid crystals are moved by a flecxoelectric force generated by the electric field E, and the liquid crystal mode is deformed. The direction planar vector n̂ rotates by Φ(E) based on a rotation axis which is a direction of the electric field E (a Z direction). Φ(E) means that a rotation angle is proportional to a strength of the electric field E. In the liquid crystal mode, flexoelectric polarization is generated, and accordingly, the liquid crystal mode has a transmittance characteristic which depends on polarization of incident light. In addition, gradation may be adjusted by adjusting strength of an applied voltage.

Figure 6:
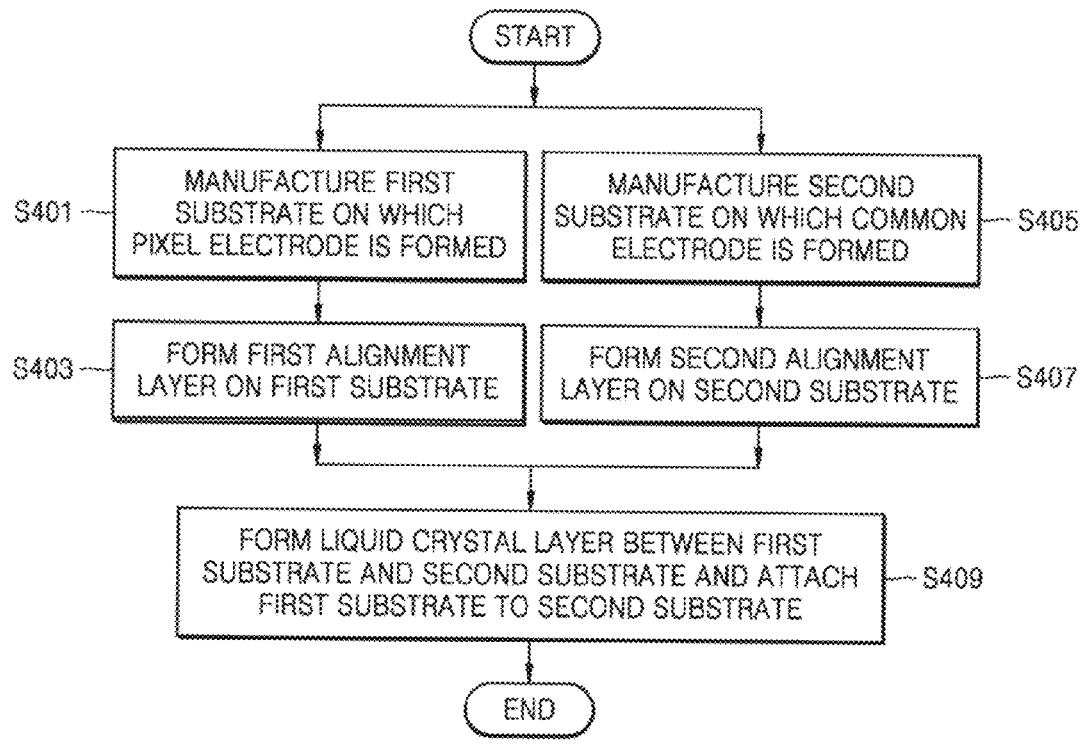
FIG. 6 is a schematic flowchart of a method of manufacturing a liquid crystal display device according to an embodiment of the present invention.
Figure 7A:
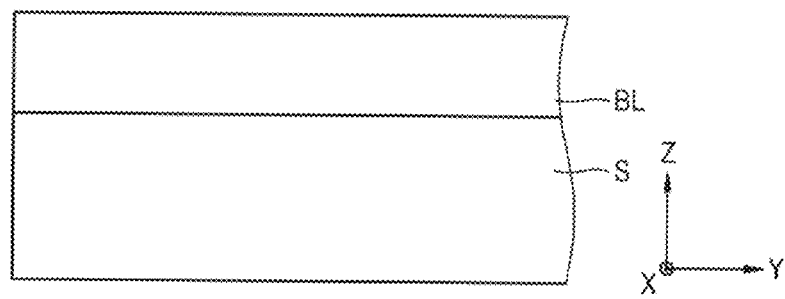
FIGS. 7A through 7E are diagrams of a detailed method of forming an alignment layer of the flowchart of FIG. 6.
Figure 7B:
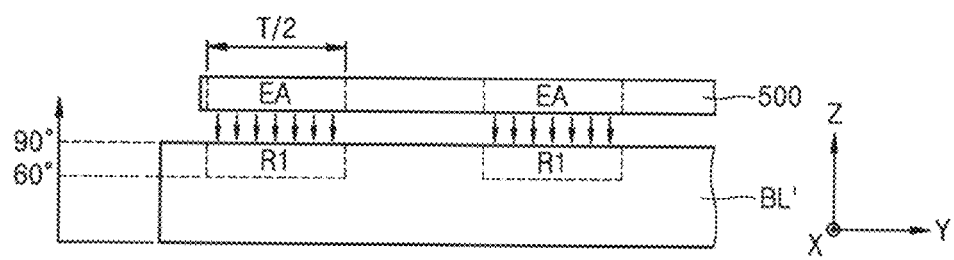
Figure 7C:
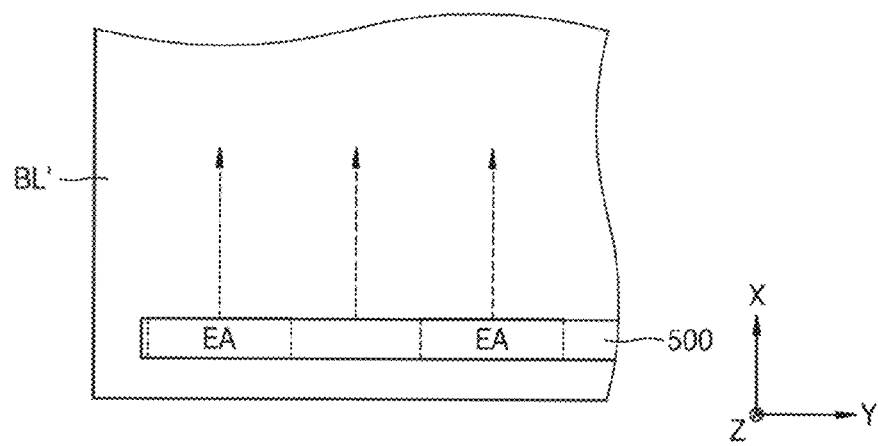

FIG. 6 is a schematic flowchart of a method of manufacturing a liquid crystal display device according to an embodiment of the present invention, and FIGS. 7A through 7C are diagrams of a detailed method of forming an alignment layer of the flowchart of FIG. 6.

Referring to FIG. 6, a first substrate on which pixel electrodes are formed and a second substrate on which a common electrode is formed are formed first in operations S401 and S405. A TFT array layer may be further formed on the first substrate as described above, and color filters may be further formed on the second substrate. However, the present invention is not limited thereto, and the color filters may be formed on the first substrate.

Then, a first alignment layer is formed on the first substrate in operation S403, and a second alignment layer may be formed on the second substrate in operation S407. As described above, the first alignment layer and/or the second alignment layer may have graduation distribution ranging from about 0 degrees to about 90 degrees. Alternatively, any one of the first and second alignment layers may be a planar alignment layer or a homeotropic alignment layer.

A liquid crystal layer is formed between the first substrate and the second substrate in operation S409.

Operations S403 and S407 for forming the first alignment layer and/or the second alignment layer will be described with reference to FIGS. 7A through 7E.

As described with reference to FIG. 7A, an alignment composition layer BL is formed on a substrate S. The substrate S may be the first substrate on which the pixel electrodes are formed and/or the second substrate on which the common electrode is formed. Also, a TFT array layer and color filters may be respectively formed on any one of the first substrate and the second substrate.

The alignment composition layer BL may be formed of a polymerized vertical photo-alignment material. For example, the polymerized vertical photo-alignment material is a polymerized photoreactive material of which an alignment direction is changed according to an irradiation amount of the UV light, and the alignment composition layer BL may be PSCN (polysiloxane cinnamate), Poly(w(4-chalconyloxy) alkoxyphenlymaleimide), or a polyimide-based light alignment layer, but is not limited thereto. The alignment composition layer BL has a vertical alignment group, and an entire surface of the alignment composition layer BL may be irradiated with UV light. An irradiation direction of the UV light may be determined according to a characteristic of the alignment composition layer BL. For example, a determination may be made according to whether the vertical alignment group is arranged in an irradiation direction of UV light or whether the vertical alignment group is arranged in a direction perpendicular to the irradiation direction of UV light.

As shown in FIG. 7B, an alignment composition layer BL' is irradiated with UV light by using a light exposure device 500. Openings EA having a predetermined width are repeatedly formed on the light exposure device 500, and a certain area of the alignment composition layer BL' is light-exposed via the openings EA. The openings EA may be repeatedly arranged in a Y direction. The light-exposed area may be adjusted by adjusting the width of the openings EA of the light exposure device 500. If a desired distribution cycle of a pretilt angle is T, the width of the openings EA may be T/2. Although the light exposure device 500 is briefly illustrated, the light exposure device 500 may include an optical member for adjusting an optical path to allow light to emit from a light source through the openings EA, a driving unit for moving the light exposure device 500 to a desired location on a substrate, or the like.

In FIG. 7A, since the alignment composition layer BL is formed of a material of which a pretilt angle is gradually changed from 90 degrees and 0 degrees according to an irradiation amount of UV light, the distribution of the pretilt angle of the alignment composition layer BL' is different from that of the pretilt angle of the alignment composition layer BL due to the irradiation of the UV light.

The irradiation amount of the UV light may allow the pretilt angle to change from 90 degrees to about 60 degrees. According to the irradiation of the UV light, the alignment composition layer BL' may include a first region R1 of which a pretilt angle is changed to about 60 degrees.

Referring to FIG. 7C, the light exposure device 500 operates to make the light emitted through the openings EA be scanned along an X direction on the alignment composition layer BL'. However, the present embodiment is not limited thereto. If a length of the X direction of the openings EA is great enough, a scanning process may be unnecessary.

Figure 7D:
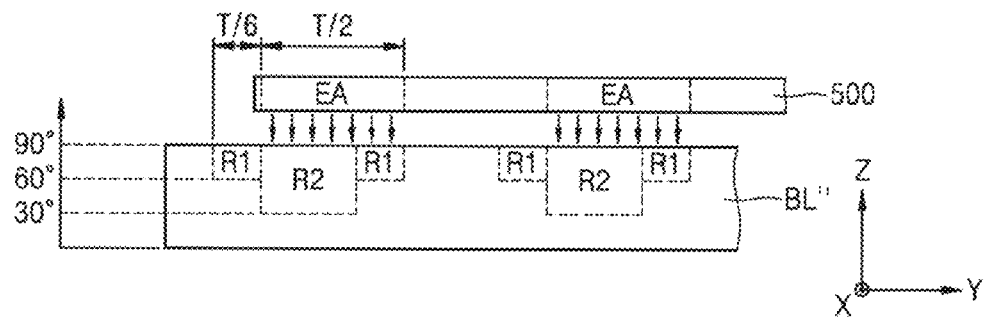

Referring to FIG. 7D, the light exposure device 500 is moved by a predetermined distance in a Y direction. The distance may be determined by dividing a width of the openings EA, but is not limited thereto. In FIG. 7D, the light exposure device 500 is moved by T/6, which is a third of a width of the openings EA, in the Y direction. Although the light exposure device 500 is moved in the Y direction, but is just an example. A relative distance between the light exposure device 500 and the alignment composition layer BL may be moved in the Y direction. That is, a substrate on which the alignment composition layer BL is formed may be moved in a negative Y direction. In a state shown in FIG. 7D, the above scanning process may be performed in an X direction or may not be performed, depending on a length of the X direction of the openings EA.

An alignment composition layer BL" may include the first region R1 of which a pretilt angle rotates in a horizontal direction, and a second region R2 of which a pretilt angle rotates greater than the pretilt angle of the first region R1 in the horizontal direction. The first region R1 has the pretilt angle that is about 60 degrees, and the second region has the pretilt angle that is about 30 degrees.

Figure 7E:
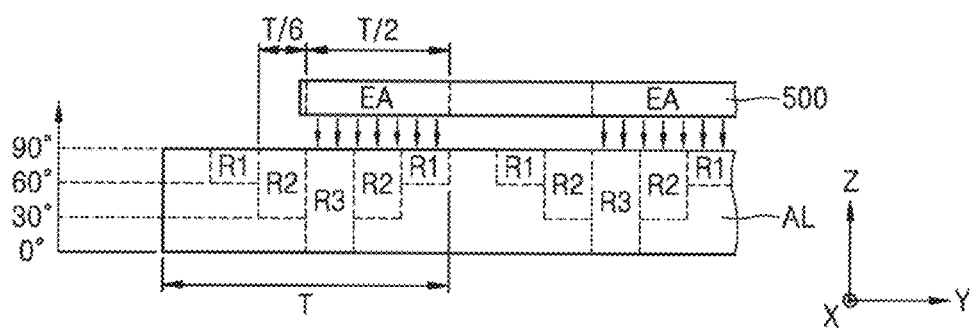

As shown in FIG. 7E, the light exposure device 500 is moved in by T/6 in a Y direction, and the light that is scanned in an X direction is emitted.

A third region R3, of which a pretilt angle rotates greater than the pretilt angle of the second region R2 in a horizontal direction, is formed, and the first region R1 which has the pretilt angle that is about 60 degrees, and the second region which has the pretilt angle that is about 30 degrees are further formed. That is, an alignment layer AL, which has a distribution profile of a pretilt angle decreased from 90 degrees to 0 degrees and then increased to 90 degrees, is formed.

An irradiation amount of light may vary in every area of the alignment composition layer BL because the light is emitted as described above. For example, the irradiation amount of light may have distribution which is gradually increased and then decreased. Since the alignment composition layer BL is formed of a material which helps change vertical alignment to horizontal alignment according to the irradiation amount of light, an area where the UV light is not emitted maintains a pretilt angle of about 90 degrees. As the irradiation amount of light increases, a distribution profile of the pretilt angle may decrease from 60 degrees, 30 degrees and to 0 degrees.

In the above description, the distribution of the pretilt angle, for example, 90 degrees, 60 degrees, 30 degrees, and 0 degrees, and a movement step of T/6 are examples of the present embodiment. The movement step may be decreased to reduce an angular gap, or almost continuous distribution may be formed.

As described above, the light exposure device 500 emits light downwards, is moved in an X or Y direction, and emits the light to a desired location of the alignment composition layer BL. However, the present embodiment is not limited thereto.

For example, an alignment layer having a desired pretilt angle may be formed by rather precisely adjusting a light-exposed area on the alignment composition layer BL by using a Lloyd's mirror (refer to Soft matter 2013. 9, p 51).

According to a liquid crystal display device and a method of manufacturing the same according to one or more embodiments of the present invention, since a liquid crystal layer may have a stable ULH mode, a display device having wide viewing angles and a fast response time may be provided.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A liquid crystal display device, comprising:
  a first substrate;
  a first alignment layer formed on the first substrate;
  a second substrate;
  a second alignment layer formed on the second substrate; and
  a liquid crystal layer disposed between the first and second alignment layers and comprising liquid crystals of a helical structure in which a helical axis of the helical structure is parallel to the first and second substrates,
  at least one of the first and second alignment layers including a first region, a second region and a third region, the second region disposed between the first and the third region, a pretilt angle of the first region being about 0 degree, a pretilt angle of the third region being about 90 degrees, a pretilt angle of the second region being between 0 degree and 90 degrees, a change of the pretilt angles of the first through third regions being defined as a graduation distribution.

2. The liquid crystal display device of claim 1, wherein the gradual distribution is repeated in a predetermined cycle.

3. The liquid crystal display device of claim 1, wherein the gradual distribution has a stepwise shape or a sine wave shape.

4. The liquid crystal display device of claim 2, wherein, when the predetermined cycle is T and a pitch of the helical structure is P, T is a natural number that is a multiple of P/2.

5. The liquid crystal display device of claim 1, wherein said at least one of the first and second alignment layers has the gradual distribution profile of the pretilt angle, and the other of the first and second alignment layers is a planar alignment layer.

6. The liquid crystal display device of claim 1, wherein said at least one of the first and second alignment layers has the gradual distribution profile of the pretilt angle, and the other of the first and second alignment layers is a homeotropic alignment layer.

7. The liquid crystal display device of claim 1, wherein a range of a pitch P of the helical structure is 100 nm ≤P≤1μm.

8. The liquid crystal display device of claim 1, wherein said at least one of the first and second alignment layers which has the gradual distribution of the pretilt angle is formed of a polymerized photoreactive material of which an alignment direction is changed according to an amount of ultraviolet (UV) irradiation.

9. The liquid crystal display device of claim 1, wherein a thin film transistor (TFT) array is formed on the first substrate, and color filters are formed on the second substrate.

10. A method of manufacturing a liquid crystal display device, the method comprising:
preparing two substrates;
forming a first alignment layer on one of the substrates, the first alignment layer including a first region, a second region and a third region, the second region disposed between the first and the third region, a pretilt angle of the first region being about 0degree, a pretilt angle of the third region being about 90 degrees, a pretilt angle of the second region being between 0 degree and 90 degrees, a change of the pretilt angles of the first through third regions being defined as a graduation distribution;
forming a second alignment layer on the other of the substrates; and
forming a liquid crystal layer between the first and second alignment layers, the liquid crystal layer comprising liquid crystals having a helical structure in which a helical axis of the helical structure is parallel to the substrates.

11. The method of claim 10, wherein the first alignment layer is formed such that the gradual distribution is repeated in a predetermined cycle.

12. The method of claim 11, wherein the gradual distribution has a stepwise shape or a sine wave shape.

13. The method of claim 11, wherein the forming of the first alignment layer comprises:
forming an alignment composition layer including a polymerized vertical photo-alignment material on said one of the substrates; and
irradiating the alignment composition layer with different amounts of ultraviolet (UV) light by emitting different amounts of the UV light according to a position in the alignment composition layer.

14. The method of claim 13, wherein, in the irradiating of the alignment composition layer, when the predetermined cycle is T, the UV light is emitted by using a light exposure device in which openings having a width equal to T/2 are arranged in the predetermined cycle T in a first direction.

15. The method of claim 14, wherein, in the irradiating of the alignment composition layer, a relative position between the light exposure device and the alignment composition layer is moved at a predetermined distance in the first direction, and the UV light is emitted.

16. The method of claim 15, wherein, in the irradiating of the alignment composition layer, the predetermined distance is equal to a width of each of the openings divided by N, wherein N is a natural number greater than 2.

17. The method of claim 15, wherein the irradiating of the alignment composition layer further comprises emitting UV light by using the light exposure device, which scans the alignment composition layer in a second direction perpendicular to the first direction.

18. The method of claim 10, wherein the second alignment layer is a homeotropic alignment layer.

19. The method of claim 10, wherein the second alignment layer is a planar alignment layer.

20. The method of claim 10, wherein the second alignment layer has a gradual distribution profile of a pretilt angle which ranges from about 0 degrees to about 90 degrees.

* * * * *